United States Patent
Jeong et al.

(10) Patent No.: US 11,479,250 B2
(45) Date of Patent: Oct. 25, 2022

(54) VEHICLE BRAKING CONTROL SYSTEM AND METHOD

(71) Applicants: HYUNDAI MOTOR COMPANY, Seoul (KR); KIA MOTORS CORPORATION, Seoul (KR)

(72) Inventors: Jong Kyu Jeong, Seoul (KR); Young Seog Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/219,414

(22) Filed: Mar. 31, 2021

(65) Prior Publication Data
US 2022/0126829 A1   Apr. 28, 2022

(30) Foreign Application Priority Data
Oct. 28, 2020 (KR) .................. 10-2020-0140809

(51) Int. Cl.
*B60W 10/188* (2012.01)
*B60W 30/18* (2012.01)
(Continued)

(52) U.S. Cl.
CPC ......... *B60W 30/18136* (2013.01); *B60Q 9/00* (2013.01); *B60T 17/221* (2013.01);
(Continued)

(58) Field of Classification Search
CPC ........... B60W 30/18136; B60W 10/06; B60W 10/10; B60W 10/188; B60W 30/18109; B60W 2510/06; B60W 2510/182; B60W 2520/10; B60W 2530/00; B60W 2530/18; B60W 2540/12; B60W 2710/0666; B60W 2710/182; B60W 2710/10; B60W 2710/186; B60W 2720/10;
(Continued)

(56) References Cited

U.S. PATENT DOCUMENTS

| | | | | |
|---|---|---|---|---|
| 5,495,912 A | * | 3/1996 | Gray, Jr. .................. | B60T 1/10 180/65.265 |
| 7,914,085 B2 | * | 3/2011 | Tsunehara ............... | B60T 8/173 303/189 |
| 2018/0222459 A1 | * | 8/2018 | Kelly .................. | B60W 10/188 |

FOREIGN PATENT DOCUMENTS

| | | | | |
|---|---|---|---|---|
| DE | 112008002155 T5 | * | 6/2010 | ............ B60T 13/686 |
| JP | 2000190757 A | * | 7/2000 | |
| WO | WO-2019146404 A1 | * | 8/2019 | ............ B60T 13/146 |

\* cited by examiner

*Primary Examiner* — Roger L Pang
(74) *Attorney, Agent, or Firm* — Lempia Summerfield Katz LLC (57) ABSTRACT

A vehicle braking control method is provided. When a driver intends to drive a vehicle after the delivery of the vehicle or a factory mechanic intends to test the vehicle before the delivery of the vehicle after the engine is turned on even when a warning light is turned on due to the insufficiency of the brake fluid, a warning signal indicating that a level sensor is malfunctioning is generated using an instrument cluster, or driving torque of the engine is limited while a warning phrase indicating the insufficiency of the brake fluid is displayed using the cluster. Therefore, the vehicle may travel at a minimum speed. Thus, the driver is enabled to drive the vehicle to a safe place. Accordingly, a secondary accident is prevented and a subsequent maintenance operation is easily performed.

24 Claims, 5 Drawing Sheets

(51) Int. Cl.
 *B60Q 9/00* (2006.01)
 *B60W 10/06* (2006.01)
 *B60W 10/10* (2012.01)
 *B60T 17/22* (2006.01)
 *B60W 50/14* (2020.01)

(52) U.S. Cl.
 CPC ............ *B60W 10/06* (2013.01); *B60W 10/10* (2013.01); *B60W 10/188* (2013.01); *B60W 30/18109* (2013.01); *B60T 2270/406* (2013.01); *B60W 2050/146* (2013.01); *B60W 2510/06* (2013.01); *B60W 2510/1005* (2013.01); *B60W 2510/182* (2013.01); *B60W 2520/10* (2013.01); *B60W 2530/00* (2013.01); *B60W 2530/18* (2013.01); *B60W 2540/12* (2013.01); *B60W 2710/0666* (2013.01); *B60W 2710/10* (2013.01); *B60W 2710/182* (2013.01); *B60W 2710/186* (2013.01); *B60W 2720/10* (2013.01)

(58) Field of Classification Search
 CPC ......... B60W 2510/1005; B60W 50/14; B60W 2050/146; B60T 17/221; B60T 2270/406
 See application file for complete search history.

VEHICLE BRAKING CONTROL SYSTEM AND METHOD

CROSS REFERENCE TO RELATED APPLICATION

The present application claims priority to Korean Patent Application No. 10-2020-0140809, filed Oct. 28, 2020, the entire contents of which are incorporated herein for all purposes by this reference.

BACKGROUND

Field of the Disclosure

The present disclosure relates generally to a vehicle braking control system and method. More particularly, the present disclosure relates to a vehicle braking control method for providing a warning signal by a cluster. The warning signal aims to prevent an accident and enable the vehicle to travel to a safe place at a minimum speed in a case in which brake fluid is insufficient or leaks or a level sensor detecting the level of the brake fluid is malfunctioning.

Description of the Related Art

As is well known in the art, the braking of a vehicle includes a process of supplying hydraulic pressure to a wheel cylinder of a caliper from a master cylinder. The braking also includes a process in which a piston of the wheel cylinder presses a brake pad using the power of the hydraulic pressure. The braking also includes a process in which the brake pad comes into friction contact with the surface of a brake disk rotating together with a tire.

Figure 1:
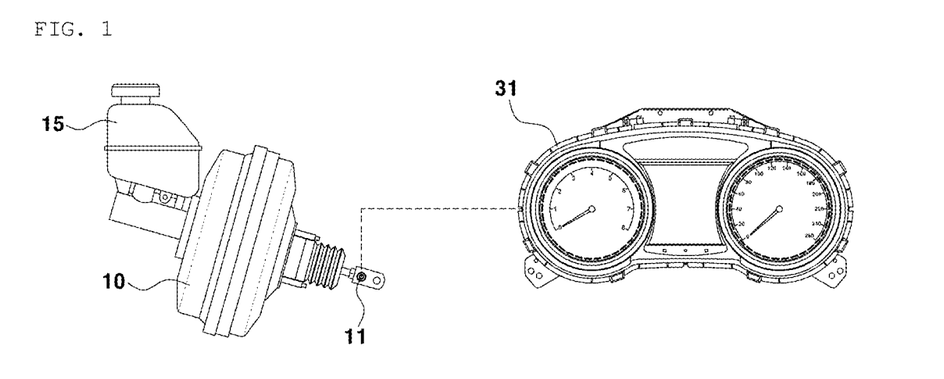
FIG. 1 is a schematic view illustrating a master cylinder, with a brake fluid tank having a level sensor being mounted thereon.

As illustrated in FIG. 1, a brake fluid tank 15 is connected to a mask cylinder 10, and a level sensor 11 sensing the level of a brake fluid is mounted on the brake fluid tank 15.

When the brake fluid stored in the brake fluid tank 15 is insufficient or leaks, a corresponding warning light of an instrument cluster, i.e., a cluster 31, is turned on in response to a detection signal from the level sensor 11, as illustrated in FIG. 1, so that the driver may recognize that the brake fluid is insufficient.

Nevertheless, when the driver starts the vehicle while pressing the brake pedal (i.e. in a brake pedal-on state) without recognizing the insufficiency of the pressing force of the brake pedal due to the insufficient brake fluid, the vehicle may be started.

However, when the driver presses the brake pedal again while driving the vehicle by pressing the accelerator pedal, the insufficiency of the pressing force of the brake pedal due to the insufficient brake fluid may cause the brake pedal to feel spongy. At the same time, the brake fluid for braking hydraulic pressure may not be sufficiently supplied to the wheel cylinders of the front and rear wheels and thus fails to produce an intended amount of braking force.

In this manner, when the insufficiency or leakage of the brake fluid occurs or when the level sensor detecting the level of the brake fluid is malfunctioning, a corresponding warning light of the cluster is turned. However, despite the above situation, when the driver starts the vehicle without recognizing the spongy brake pedal, an intended amount of braking force may not be obtained in a braking situation, which may lead to an accident, such as a vehicle collision.

Therefore, in order to prevent an accident due to the insufficiency of intended braking force in a braking situation during the driving of a vehicle, a control technology was proposed in the related art. This technology is devised to stop the vehicle by turning the engine off at the moment that the warning light is turned on due to the insufficiency of the brake fluid. However, after the vehicle is stopped due to the turning off of the engine, the vehicle may not move to a safe place (e.g. a side road on which no vehicles travel). Thus, a secondary accident, such as a collision of a following vehicle with the stopped vehicle, may occur. In addition, since the stopped vehicle may not travel to a repair shop, a tow truck must be called, which is problematic.

The foregoing is intended merely to aid in the understanding of the background of the present disclosure, and is not intended to mean that the present disclosure falls within the purview of the related art that is already known to those having ordinary skill in the art.

SUMMARY

Accordingly, the present disclosure has been made keeping in mind the above problems occurring in the related art, and the present disclosure is intended to propose a vehicle braking control method. The method may be performed when the driver still intends to drive a vehicle after the delivery of the vehicle or a factory mechanic still intends to test the vehicle before the delivery of the vehicle after the engine is turned on even when the warning light is turned on due to the insufficiency of the brake fluid. In the method, a warning signal indicating that the level sensor is malfunctioning is generated using the cluster. Alternatively, driving torque of the engine is limited while, for example, a warning phrase indicating the insufficiency of the brake fluid is displayed using the cluster. Therefore, the vehicle may travel at a minimum speed. Thus, the driver may drive the vehicle to a safe place. Accordingly, a secondary accident may be prevented and a subsequent maintenance operation may be easily performed.

In order to achieve the above objective, according to one aspect of the present disclosure, a vehicle braking control method is provided. The method includes: determining a start state of an engine of a vehicle; determining whether or not a warning light of a cluster is turned on, the warning light indicating insufficiency of a brake fluid; determining, by a braking controller, whether or not a brake pedal is in an on state; when the brake pedal is in the on state, determining whether or not braking hydraulic pressure has actually been generated; when the braking hydraulic pressure is determined not to be actually generated, displaying, by the cluster, a warning phrase indicating the insufficiency of the brake fluid and a guidance phrase for a method of finally stopping the vehicle while controlling the vehicle to travel at a minimum speed or stop by cooperative control between the braking controller and an engine controller.

After the warning light is turned on in a situation in which the engine is in a turned-off state, when the engine is turned on in the on state of the brake pedal, an operation in which the braking controller determines a mileage of the vehicle, an operation of determining whether or not the braking hydraulic pressure is actually generated, and an operation of determining whether or not a current shift position is moved to a drive (D) position or a reverse (R) position may be performed sequentially.

According to a first embodiment of the present disclosure, when the mileage exceeds a reference distance for determining whether or not the vehicle has been delivered, the braking hydraulic pressure is not generated, and the current shift position is the D position or the R position, the cluster may display a warning phrase indicating the insufficiency of the brake fluid and a guidance phrase indicating a method of finally stopping the vehicle. Simultaneously, driving torque of the engine may be limited by a cooperative control operation of the braking controller and the engine controller so that the vehicle travels at the minimum speed.

According to a second embodiment of the present disclosure, when the mileage does not exceed a reference distance for determining whether or not the vehicle has been delivered, the braking hydraulic pressure is not generated, and the current shift position is the D position or the R position, the cluster may display a warning phrase indicating the insufficiency of the brake fluid. Simultaneously, driving torque of the engine may be limited by a cooperative control operation of the braking controller and the engine controller so that the vehicle stops.

The determining of whether or not the braking hydraulic pressure is actually generated may include: detecting, by a pressure sensor of the braking controller, a change in the braking hydraulic pressure; comparing, by the braking controller, the change in the braking hydraulic pressure with a reference value; and when the change in the braking hydraulic pressure exceeds the reference value as a result of the comparison, determining that the braking hydraulic pressure is generated ordinarily, and when the change in the braking hydraulic pressure does not exceed the reference value, determining that the braking hydraulic pressure is not generated.

According to a third embodiment of the present disclosure, when the warning light of the cluster is turned on in a situation in which the engine is in a turned-on state, operations of checking, by the braking controller, a current shift position; when the current shift position is a D position, determining whether or not the brake pedal is in the on state; determining whether or not the braking hydraulic pressure is actually generated, using different methods, depending on whether or not the brake pedal is in the on state; and displaying, by the cluster, different phrases depending on whether or not the braking hydraulic pressure is actually generated while performing a cooperative braking control operation of a transmission control unit and the engine controller may be performed sequentially.

When the brake pedal is in the on state, the determining of whether or not the braking hydraulic pressure is actually generated may include: detecting, by a pressure sensor of the braking controller, a change in the braking hydraulic pressure; comparing, by the braking controller, the change in the braking hydraulic pressure detected by the pressure sensor with a reference value; and when the change in the braking hydraulic pressure detected by the pressure sensor exceeds the reference value as a result of the comparison, determining that the braking hydraulic pressure is generated ordinarily, and when the change in the braking hydraulic pressure detected by the pressure sensor does not exceed the reference value, determining that the braking hydraulic pressure is not generated.

When the braking hydraulic pressure is determined to be generated ordinarily, the cluster may display a warning phrase indicating that a level sensor detecting a level of the brake fluid is malfunctioning. When the braking hydraulic pressure is determined to not be generated, the cluster may display a warning phrase indicating that the brake fluid is insufficient and a parking brake is required to be operated, and simultaneously, an engine braking operation of reducing driving torque of the engine may be activated by a cooperative control operation of the transmission control unit and the engine controller in order to reduce a speed of the vehicle.

When the cluster displays the warning phrase indicating that the brake fluid is insufficient and the parking brake is required to be operated, a phrase indicating the engine braking operation is required to be activated may be additionally displayed in a situation in which the vehicle is a manual transmission vehicle.

When the brake pedal is in an off state, the determining of whether or not the braking hydraulic pressure is actually generated may include: detecting, by a pressure sensor of the braking controller, a change in the braking hydraulic pressure due to oscillation; when a value of the braking hydraulic pressure detected by the pressure sensor is determined to have been changed due to the oscillation of the braking hydraulic pressure during driving over a predetermined period of time, determining, by the braking controller, that the brake fluid neither is insufficient nor leaks; when the value of the braking hydraulic pressure detected by the pressure sensor is determined to have not been changed over the predetermined period of time, determining, by the braking controller, that the brake fluid is insufficient or leaks.

When the braking controller determines that the brake fluid neither is insufficient nor leaks, the cluster may display the warning phrase indicating a level sensor is malfunctioning. When the braking controller determines that the brake fluid is insufficient or leaks, an operation of displaying, by the cluster, a warning phrase indicating that the brake fluid is insufficient and a guidance phrase indicating a method of finally stopping the vehicle and an operation of limiting driving torque of the engine so that the vehicle travels at the minimum speed by a cooperative control operation of the braking controller and the engine controller may be performed simultaneously.

According to a fourth embodiment of the present disclosure, when the warning light of the cluster is turned on in a situation in which the engine is in a turned-on state, operations of checking, by the braking controller, a current shift position; when the current shift position is a neutral (N) position, determining whether or not a current speed of the vehicle exceeds a reference speed; when the current speed of the vehicle does not exceed the reference speed, determining whether or not the brake pedal is in the on state; determining whether or not the braking hydraulic pressure is actually generated, using different methods, depending on whether or not the brake pedal is in the on state; and displaying, by the cluster, different phrases depending on whether or not the braking hydraulic pressure is actually generated while performing a cooperative braking control operation of the braking controller and the engine controller may be performed sequentially.

When the brake pedal is in the on state, the determining of whether or not the braking hydraulic pressure is actually generated may include: detecting, by a pressure sensor of the braking controller, a change in the braking hydraulic pressure; comparing, by the braking controller, the change in the braking hydraulic pressure detected by the pressure sensor with a reference value; and when the change in the braking hydraulic pressure detected by the pressure sensor exceeds the reference value as a result of the comparison, determining that the braking hydraulic pressure is generated ordinarily, and when the change in the braking hydraulic pressure detected by the pressure sensor does not exceed the reference value, determining that the braking hydraulic pressure is not generated.

When the braking hydraulic pressure is determined to be generated ordinarily, the cluster may display a warning phrase indicating that a level sensor detecting a level of the brake fluid is malfunctioning. When the braking hydraulic pressure is determined to not be generated, the cluster may display a warning phrase instructing that the vehicle remain in a stopped state.

When the brake pedal is in an off state, the determining of whether or not the braking hydraulic pressure is actually generated may include: determining, by a pressure sensor of the braking controller, whether or not the braking hydraulic pressure has changed over a predetermined period of time; comparing the change in the braking hydraulic pressure over the predetermined period of time, detected by the pressure sensor, with a reference value; and when the change in the braking hydraulic pressure over the predetermined period of time, detected by the pressure sensor, exceeds the reference value as a result of the comparison, determining that the braking hydraulic pressure is generated ordinarily, and when the change in the braking hydraulic pressure over the predetermined period of time, detected by the pressure sensor, does not exceed the reference value, determining that the braking hydraulic pressure is not generated.

When the braking hydraulic pressure is determined to be generated ordinarily, the cluster may display a warning phrase indicating that a level sensor is malfunctioning, and simultaneously, the engine controller may control a maximum speed of the vehicle to be limited to an upper threshold. When the braking hydraulic pressure is determined to not be generated ordinarily, the cluster may display a warning phrase instructing that the vehicle remain in a stopped state and the engine controller may control the maximum speed of the vehicle to be limited to a lower threshold.

According to a fifth embodiment of the present disclosure, when the warning light of the cluster is turned on in a situation in which the engine is in a turned-on state, operations of checking, by the braking controller, a current shift position; when the current shift position is an N position, determining whether or not a current speed of the vehicle exceeds a reference speed; when the current speed of the vehicle exceeds the reference speed, determining whether or not the brake pedal is in the on state; determining whether or not the braking hydraulic pressure is actually generated, using different methods, depending on whether or not the brake pedal is in the on state; and displaying, by the cluster, different phrases depending on whether or not the braking hydraulic pressure is actually generated while performing a cooperative braking control operation of a transmission control unit and the engine controller may be performed sequentially.

When the brake pedal is in the on state, the determining of whether or not the braking hydraulic pressure is actually generated may include: detecting, by a pressure sensor of the braking controller, a change in the braking hydraulic pressure; comparing, by the braking controller, the change in the braking hydraulic pressure detected by the pressure sensor with a reference value; and when the change in the braking hydraulic pressure detected by the pressure sensor exceeds the reference value as a result of the comparison, determining that the braking hydraulic pressure is generated ordinarily, and when the change in the braking hydraulic pressure detected by the pressure sensor does not exceed the reference value, determining that the braking hydraulic pressure is not generated.

When the braking hydraulic pressure is determined to be generated ordinarily, the cluster may display a warning phrase indicating that a level sensor detecting a level of the brake fluid is malfunctioning. When the braking hydraulic pressure is determined to not be generated, the cluster may display a warning phrase indicating that the brake fluid is insufficient and a parking brake is required to be operated, and simultaneously, an engine braking operation of reducing driving torque of the engine may be activated by a cooperative control operation of the transmission control unit and the engine controller in order to reduce a speed of the vehicle.

When the cluster displays the warning phrase indicating that the brake fluid is insufficient and the parking brake is required to be operated, a phrase indicating the engine braking operation is required to be activated may be additionally displayed in a situation in which the vehicle is a manual transmission vehicle.

When the brake pedal is in an off state, the determining of whether or not the braking hydraulic pressure is actually generated may include: determining, by a pressure sensor of the braking controller, whether or not the braking hydraulic pressure has changed over a predetermined period of time; comparing the change in the braking hydraulic pressure over the predetermined period of time, detected by the pressure sensor, with a reference value; and when the change in the braking hydraulic pressure over the predetermined period of time, detected by the pressure sensor, exceeds the reference value as a result of the comparison, determining that the braking hydraulic pressure is generated ordinarily, and when the change in the braking hydraulic pressure over the predetermined period of time, detected by the pressure sensor, does not exceed the reference value, determining that the braking hydraulic pressure is not generated.

When the braking hydraulic pressure is determined to be generated ordinarily, the cluster may display a warning phrase indicating that a level sensor is malfunctioning. When the braking hydraulic pressure is determined to not be generated, the cluster may display a warning phrase indicating that the brake fluid is insufficient and a parking brake is required to be operated, and simultaneously, a control standby mode cooperative with the transmission control unit and the engine controller may be taken in order to reduce a speed of the vehicle.

When the brake pedal is in the on state while the control standby mode cooperative with the transmission control unit and the engine controller is being maintained, an engine braking operation of gradually reducing driving torque of the engine may be activated by a control cooperative operation of the transmission control unit and the engine controller.

Embodiments of the present disclosure provide the following effects.

First, in one embodiment, after the engine is turned on, even when the warning light is turned on due to the insufficiency of the brake fluid when the engine is in a turned-off state, when the driver still intends to drive a vehicle after the delivery of the vehicle, a warning signal indicating that the level sensor is malfunctioning is generated using the cluster. In another embodiment, driving torque of the engine may be limited while, for example, a warning phrase indicating the insufficiency of the brake fluid is displayed using the cluster. Therefore, the vehicle may travel at a minimum speed. Thus, the driver may drive the vehicle to a safe place. Accordingly, a secondary accident may be prevented and a subsequent maintenance operation may be easily performed.

Second, in one embodiment, after the engine is turned on even when the warning light is turned on due to the insufficiency of the brake fluid when the engine is in a turned-off state, when a factory mechanic intends to perform test driving, a warning signal indicating that the level sensor is malfunctioning is generated using the cluster. In another embodiment, engine torque may be limited while, for example, a warning phrase indicating the insufficiency of the brake fluid is displayed using the cluster. Thus, the vehicle may stop in an assembly line.

Accordingly, the vehicle may be prevented from an accident in the assembly line. Problems involved in an assembly process may be inspected so that subsequent operations, such as the inspection or replacement of the brake fluid, may be easily performed.

Third, in one embodiment, when the warning light is turned on due to the insufficiency of the brake fluid when the engine is in a turned-off state, the cluster may provide a warning phrase indicating that the level sensor is malfunctioning depending on conditions regarding the current shift position, the vehicle speed, the brake pedal-on state, or the like. In another embodiment, engine braking may be activated or the driving torque of the engine may be limited while the cluster is providing a warning phrase indicating the insufficiency of the brake fluid. Accordingly, the vehicle may be driven to a safe place, and thus, a secondary accident may be prevented and a subsequent maintenance operation may be easily performed.

BRIEF DESCRIPTION OF THE DRAWINGS

The above and other objectives, features, and other advantages of the present disclosure are more clearly understood from the following detailed description when taken in conjunction with the accompanying drawings, in which.

DETAILED DESCRIPTION OF THE DISCLOSURE

Hereinafter, specific embodiments of the present disclosure are described in detail with reference to the accompanying drawings. When a component, device, element, or the like of the present disclosure is described as having a purpose or performing an operation, function, or the like, the component, device, or element should be considered herein as being "configured to" meet that purpose or to perform that operation or function, or the like. Further, the controller described herein may include a processor programmed to perform the noted operation, function, operation, or the like.

Figure 2:
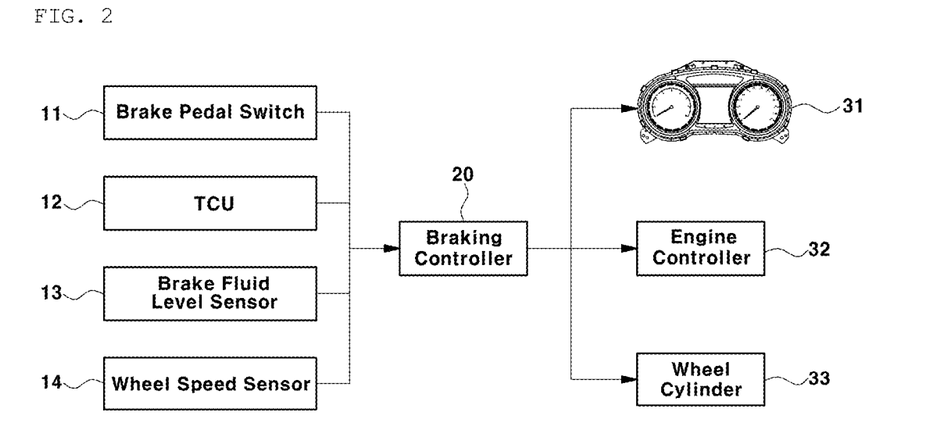
FIG. 2 is a diagram illustrating a control configuration for a braking control method according to the present disclosure.

In the accompanying drawings, FIG. 2 illustrates a control configuration for a braking control method according to the present disclosure, in which reference numeral 20 designates a braking controller.

The braking controller 20 may be implemented as, for example, an anti-lock brake system (ABS) control unit for preventing the locking of wheels during sudden braking or an electronic stability control (ESC) unit for maintaining the position of a vehicle body to be stable. Herein, the braking controller 20 is referred to as the braking controller.

A brake pedal switch 11, a transmission control unit (TCU) 12, a level sensor 13, a wheel speed sensor 14, and the like are connected to an input end of the braking controller 20 such that an electric signal may be transmitted between each of the former and the latter.

Thus, when a driver presses a brake pedal, the brake pedal switch 11 transmits a brake pedal-on signal to the braking controller 20. The TCU 12 transmits a signal indicating the current shift position to the braking controller 20. In addition, the level sensor 13 transmits a signal obtained by detecting a brake fluid level inside a brake fluid tank to the braking controller 20, and the wheel speed sensor 14 transmits a wheel speed signal to the braking controller 20.

An output end of the braking controller 20 is connected to a cluster 31 including a warning light for generating a driver warning signal, an engine controller 32 for controlling driving torque or the like of an engine, and the like such that an electric signal may be transmitted between the former and each of the latter.

Here, the braking controller 20 performs a control operation of distributing braking hydraulic pressure to wheel cylinders 33 for braking the front and rear wheels.

The braking control method according to the present disclosure, on the basis of the above-described configuration, is described hereinafter.

First Embodiment and Second Embodiment

Figure 3:
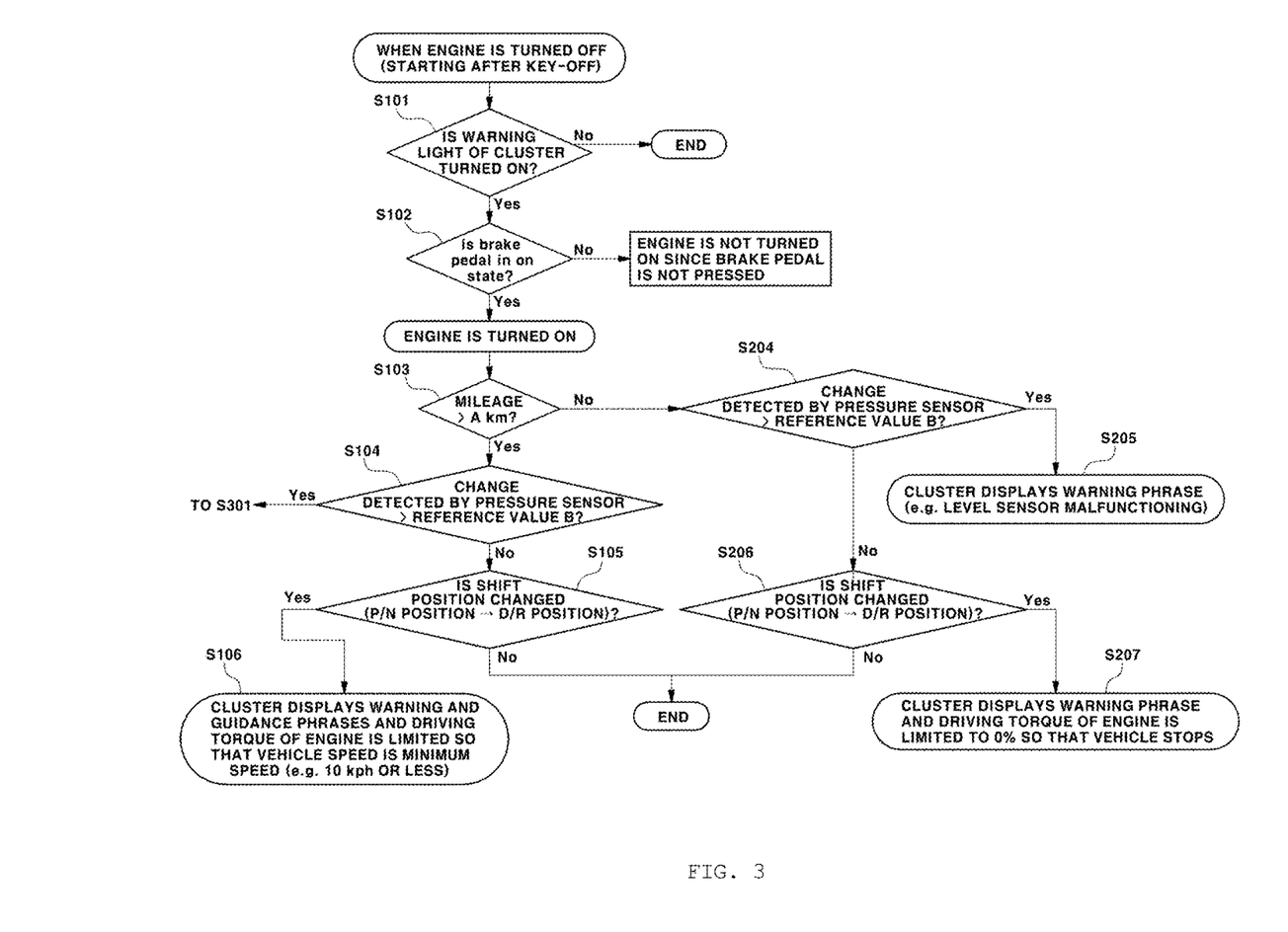
FIG. 3 is a flowchart illustrating a vehicle braking control method according to first and second embodiments of the present disclosure.

In the accompanying drawings, FIG. 3 is a flowchart illustrating a vehicle braking control method according to first and second embodiments of the present disclosure.

The first embodiment of the present disclosure may be performed after the engine is turned on even when the warning light is turned on due to the insufficiency of the brake fluid when the engine is in a turned-off state, when the driver still intends to drive a vehicle after the delivery of the vehicle. In this embodiment, a warning signal indicating that the level sensor is malfunctioning is generated using the cluster. In another embodiment, driving torque of the engine is limited while, for example, a warning phrase indicating the insufficiency of the brake fluid is displayed using the cluster. Thus, the vehicle may travel to a safe place at a minimum speed.

In addition, the second embodiment of the present disclosure may be performed after the engine is turned on even when the warning light is turned on due to the insufficiency of the brake fluid when the engine is in a turned-off state, when a factory mechanic intends to perform test driving before the delivery of the vehicle. In this embodiment, a warning signal indicating that the level sensor is malfunctioning is generated using the cluster. In another embodiment, the driving torque of the engine is limited while, for example, a warning phrase indicating the insufficiency of the brake fluid is displayed using the cluster. Thus, the vehicle may travel at the minimum speed.

In this regard, first, in S101, whether or not the warning light of the cluster related to the insufficiency of the brake fluid is turned on is determined when the engine is in the turned-off state.

For example, when the brake fluid is insufficient, the braking controller 20 that has received the signal from the level sensor 13 controls the corresponding light of the cluster 31 to be turned on.

Afterwards, whether or not the brake pedal is in an on state is determined in S102.

For example, when the braking controller 20 receives the brake pedal-on signal from the brake pedal switch 11 and the brake pedal-on signal indicates that the driver has pressed the brake pedal, the braking controller 20 recognizes the brake pedal is in the on state.

Here, even in the case that the warning light of the cluster is turned on, the driver may turn on the engine of the vehicle while pressing the brake pedal (i.e. in a brake-on state) without recognizing that the brake pedal is pressed with an insufficient amount of force due to the insufficiency of the brake fluid.

Subsequently, in S103, when the engine is turned on, the mileage of the vehicle is checked.

For example, the braking controller 20 may check the mileage of the vehicle by receiving information, regarding a total of distances that the vehicle has traveled from the point in time of the delivery to the present, from an odometer (OD) of the cluster.

The mileage of the vehicle is checked in order to determine whether the vehicle is in a driving condition obtained by the driver after the delivery of the vehicle or in an evaluation driving condition obtained by the factory mechanic to finally evaluate the performance of the vehicle before the delivery of the vehicle after the fabrication of the vehicle.

In general, the mileage according to the evaluation driving performed by the factory mechanic is about 5 km to about 6 km. Thus, a reference distance by which the mileage of the vehicle is checked in the step S103 may be set to be about 5 km to about 6 km.

Accordingly, when the mileage of the vehicle is determined to exceed the reference distance in the checking step S103, the vehicle is determined to be in the driving condition obtained by the driver after the delivery of the vehicle, and subsequent steps S104 to S107 are performed. In contrast, when the mileage of the vehicle is determined to not exceed the reference distance, the vehicle is determined to be in the evaluation driving condition obtained by the factory mechanic before the delivery of the vehicle after the fabrication thereof in the factory, and subsequent steps S204 to S207 are performed.

Subsequently, when the mileage of the vehicle is determined to exceed the reference distance and the vehicle is determined to be in the driving condition obtained by the driver, whether or not braking hydraulic pressure is actually generated is determined in S104.

For example, the ESC unit used as the braking controller includes a pressure sensor detecting a change in the braking hydraulic pressure. The pressure sensor may detect the change in the braking hydraulic pressure in response to the braking pedal being in the on state.

Accordingly, the step S104 of determining whether or not the braking hydraulic pressure is actually generated may be a process in which the braking controller 20 compares a change in a detection value of the pressure sensor with a reference value B.

As a result of the comparison, when the change in the detection value of the pressure sensor exceeds the reference value B, the braking hydraulic pressure in response to the brake pedal-on state is determined to be generated ordinarily. In contrast, when the change in the detection value of the pressure sensor does not exceed the reference value B, the braking hydraulic pressure in response to the brake pedal-on state is determined to not be generated.

Here, even in the case that the braking hydraulic pressure in response to the brake pedal-on state is determined to be generated ordinarily in the step S104, when the warning light of the cluster is determined to be in a turned-on state in the step S101, the level sensor detecting the level of the brake fluid may be determined to be malfunctioning.

When the braking hydraulic pressure is determined to be generated ordinarily, step S301 of determining whether or not the warning light of the cluster related to the insufficiency of the brake fluid is turned on may be performed again. When the warning light is determined to be in the turned-on state in the step S301, steps S302 to S324 may be performed as described below.

In contrast, when the braking hydraulic pressure in response to the brake pedal-on state is determined to not be generated in the step S104, the brake fluid is insufficient at present. Then, even when the brake pedal is pressed in a braking situation, the brake pedal is pressed by an insufficient amount of force, thereby causing the brake pedal to feel spongy. Since the brake fluid for the braking hydraulic pressure is not sufficiently supplied to the wheel cylinders of the front and rear wheels, an intended amount of braking force may not be obtained. Thus, this may lead to a collision.

Furthermore, when a control operation of stopping the engine due to the insufficiency of the brake fluid or the like is performed, the engine may be stopped so that the vehicle may not move to a safe place (e.g. a side road on which no vehicles travel). Thus, a following vehicle may collide with the subject vehicle. Thus, this may cause a secondary accident.

In order to prevent such a vehicle collision, when the driver intends to travel, the warning phrase indicating the insufficiency of the braking fluid may be displayed and the driving torque of the engine may be limited so that the vehicle may travel at the minimum speed. Thus, the vehicle may be driven to the safe place.

In this regard, in S105, the braking controller 20 may determine whether or not the shift position is a drive shift position, such as the drive (D) position or the reverse (R) position, in which the vehicle may be driven, in order to determine the intention of the driver to travel.

For example, the braking controller 20 may determine whether or not the current shift position is the drive shift position, such as the D position or the R position, on the basis of a signal regarding the current shift position transmitted from the TCU 12.

When the current shift position is determined to be the D position or the R position in the step S105, the cluster 31 displays a warning phrase indicating the insufficiency of the brake fluid and a guidance phrase indicating a method of finally stopping the vehicle, and at the same time, a control operation of limiting the driving torque of the engine so that the vehicle travels at the minimum speed is performed in S106.

For example, when the braking controller 20 transmits the signal indicating the insufficiency of the brake fluid to the cluster 31, the cluster 31 displays a warning phrase, e.g. "BRAKE FLUID INSUFFICIENT", and a guidance phrase, e.g. "PLEASE OPERATE PARKING BRAKE WHEN BRAKING VEHICLE, SINCE THERE IS POSSIBILITY OF FAILURE IN BRAKING HYDRAULIC PRESSURE LINE". When the braking controller 20 transmits the signal regarding the limited driving torque of the engine to the engine controller 32, the engine controller 32 performs a cooperative control operation of limiting the driving torque of the engine so that the vehicle travels at the minimum speed (e.g. a low speed of about 10 kph or less).

Accordingly, in response to the warning phrase and the guidance phrase provided by the cluster, the driver may drive the vehicle to a safe place (e.g. a side road of a highway) at the minimum speed. In addition, since the vehicle is traveling at the minimum speed (e.g. a low speed of about 10 kph or less) when the vehicle arrives at the safe place, the driver may safely stop the vehicle by only operating the parking brake. Accordingly, a secondary accident may be prevented and a subsequent maintenance operation may be easily performed.

In contrast, when the mileage of the vehicle is determined not exceed the reference distance in the checking step S103, the vehicle is determined to be in the evaluation driving condition obtained by the factory mechanic before the delivery of the vehicle after the fabrication of the vehicle.

When the vehicle is determined to be in the evaluation driving condition obtained by the factory mechanic in the checking step S103, whether or not braking hydraulic pressure is actually generated is determined in S204.

For example, the ESC unit used as the braking controller includes a pressure sensor detecting a change in the braking hydraulic pressure. The pressure sensor may detect the change in the braking hydraulic pressure in response to the brake pedal-on state.

Thus, the operation of determining whether or not braking hydraulic pressure is actually generated in the step S204 may be an operation in which the braking controller 20 compares a change in the detection value of the pressure sensor with the reference value B.

As a result of the comparison, when the change in the detection value of the pressure sensor exceeds the reference value B, the braking hydraulic pressure in response to the brake pedal-on state is determined to be generated ordinarily. In contrast, the change in the detection value of the pressure sensor does not exceed the reference value B, the braking hydraulic pressure in response to the brake pedal-on state is determined to not be generated.

Here, even in the case that the braking hydraulic pressure in response to the brake pedal-on state is determined to be generated ordinarily in the step S204, when the warning light of the cluster is turned on, the level sensor detecting the level of the brake fluid may be determined to be malfunctioning.

Then, the cluster 31 displays a warning phrase, such as "LEVEL SENSOR MALFUNCTIONING" or "LEVEL SENSOR INSPECTION REQUIRED", in S205.

For example, when the braking controller 20 transmits a signal indicating that the level sensor is malfunctioning to the cluster 31, the cluster 31 displays the warning phrase, such as "LEVEL SENSOR MALFUNCTIONING" or "LEVEL SENSOR INSPECTION REQUIRED".

Thus, the factory mechanic may recognize that braking hydraulic pressure system has no problem due the sufficient brake fluid by checking the warning phrase, such as "LEVEL SENSOR MALFUNCTIONING" or "LEVEL SENSOR INSPECTION REQUIRED", and take a subsequent operation of only replacing the level sensor in an assembly line.

In contrast, when the braking hydraulic pressure in response to the brake pedal-on state is determined to not be generated in the step S204, the brake fluid is insufficient at present. Then, even when the brake pedal is pressed in a braking situation, the brake pedal is pressed by an insufficient amount of force. Thus, this may cause the brake pedal to feel spongy. Since the brake fluid for the braking hydraulic pressure is not sufficiently supplied to the wheel cylinders of the front and rear wheels, an intended amount of braking force may not be obtained. Thus, this may lead to a collision in an assembly line, in which the subject vehicle collides with a preceding vehicle.

In order to prevent such a vehicle collision, the warning phrase indicating the insufficiency of the braking fluid may be displayed and the driving torque of the engine may be limited (e.g. to 0%) so as to stop the vehicle.

In this regard, in S206, the braking controller 20 may determine whether or not the shift position is a drive shift position, such as the D position or the R position, in order to determine the intention of the driver to travel.

For example, the braking controller 20 may determine whether or not the current shift position is the drive shift position, such as the D position or the R position, on the basis of a signal regarding the current shift position transmitted from the TCU 12.

When the current shift position is determined to be the D position or the R position in the step S206, the cluster 31 displays a warning phrase indicating the insufficiency of the brake fluid and a control operation of limiting the driving torque of the engine to stop the vehicle is performed in S207.

For example, when the braking controller 20 transmits the signal indicating the insufficiency of the brake fluid to the cluster 31, the cluster 31 displays a warning phrase, such as "BRAKE FLUID INSUFFICIENT" or "BRAKE FLUID INJECTION MISSED". When the braking controller 20 transmits the signal regarding the limited driving torque of the engine to the engine controller 32, the engine controller 32 performs a cooperative control operation of limiting the driving torque of the engine to 0% to stop the vehicle.

Accordingly, when the vehicle has stopped, the factory mechanic may directly perform a subsequent operation of charging the brake fluid tank with brake fluid or re-inspecting the level of the brake fluid, in response to the warning phrase displayed by the cluster.

Figure 4:
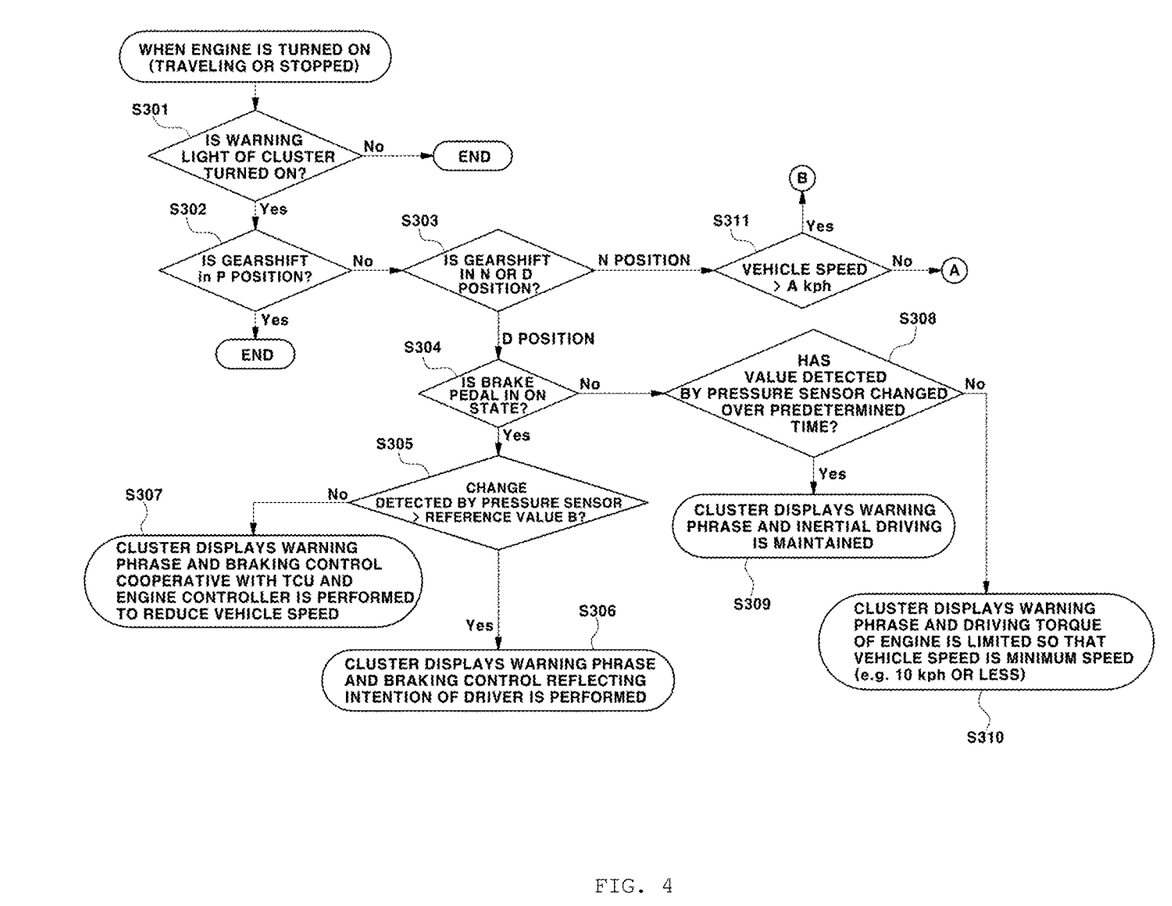
FIGS. 4 to 6 are flowcharts illustrating braking control methods for a vehicle according to third, fourth, and fifth embodiments of the present disclosure.
Figure 5:
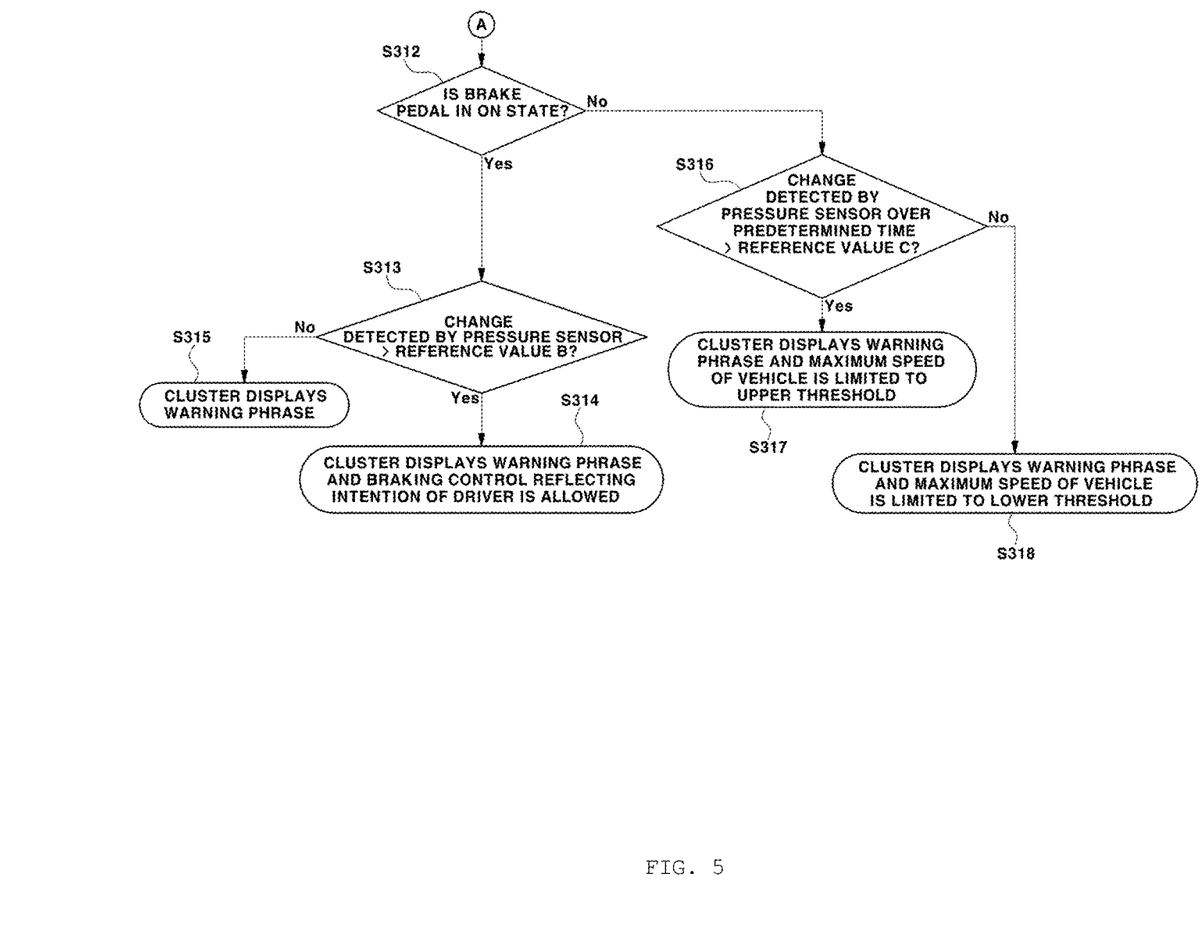
Figure 6:
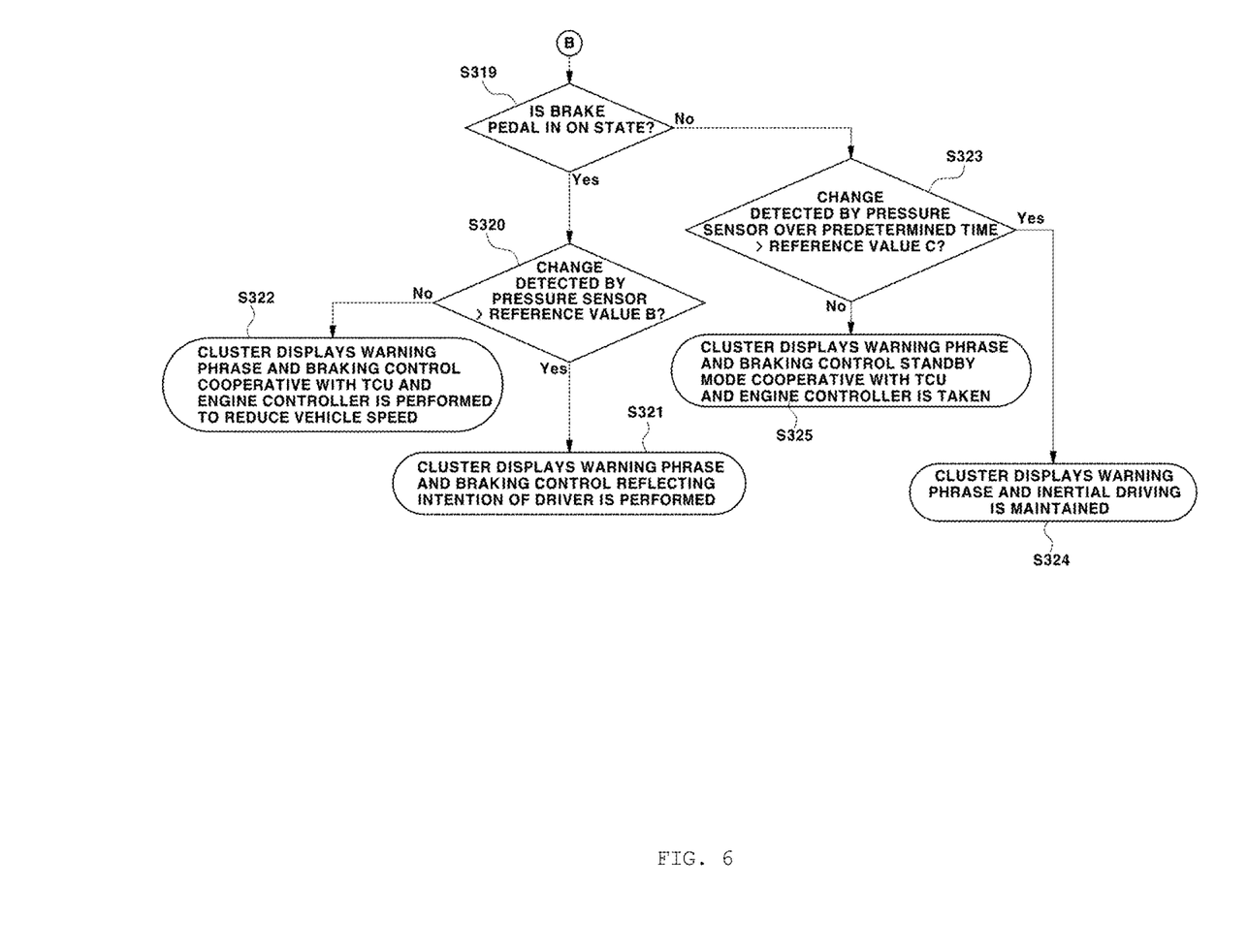

Third, fourth, and fifth embodiments of the present disclosure may be performed when, for example, the brake fluid is insufficient or the level sensor is malfunctioning during ordinary driving or stopping of the vehicle when the engine is in a turned-on state. In these embodiments, a control operation may be performed in order to limit driving torque of the engine to drive the vehicle to a safe place at the minimum speed or maintain the vehicle in a stopped state.

Third Embodiment

In the accompanying drawings, FIG. 4 is a flowchart illustrating a vehicle braking control method according to the third embodiment of the present disclosure.

In this regard, first, in S301, whether or not the warning light of the cluster related to the insufficiency of the brake fluid is turned on is determined when the engine is in a turned-on state.

Afterwards, in S302, whether or not the current shift position is a drive shift position, such as the D position or the R position, is determined in order to determine the intention of the driver to travel.

For example, the braking controller 20 may determine the current shift position on the basis of the signal regarding the current shift position transmitted from the TCU 12.

When the current shift position is determined to be the parking (P) position in the step S302, no control operation is performed, since the driver may perform a subsequent operation by checking the state of the warning light of the cluster due to the insufficiency of the brake fluid in a situation in which the driver is not intended to drive the vehicle.

Subsequently, whether the current shift position is the neutral (N) position or the D position is determined in order to determine whether the driver intends to perform inertial driving or acceleration driving in S303.

When the current shift position is determined to be the N position in the step S303, the driver is determined to intend to perform the inertial driving. When the current shift position is the D position, the driver is determined to intend to perform the acceleration driving.

When the current shift position is the D position, in subsequent processes, the braking controller determines whether or not braking hydraulic pressure is actually generated, using different methods, depending on the on state of the brake pedal. Then, the cluster displays different phrases depending on whether or not the braking hydraulic pressure is actually generated and the TCU and the engine controller perform a cooperative braking control operation in response to a signal from the braking controller.

In this regard, when the current shift position is determined to be the D shift in the step S303, whether or not the brake pedal is in the on state is determined subsequently in S304.

For example, when the braking controller 20 receives the brake pedal-on signal, indicating that the driver has pressed the brake pedal, from the brake pedal switch 11, the braking controller 20 determines the brake pedal to be in the on state.

When the brake pedal is determined to be in the on state in the step S304, whether or not the braking hydraulic pressure is actually generated is determined in S305.

For example, the ESC unit used as the braking controller includes a pressure sensor detecting a change in the braking hydraulic pressure. The pressure sensor may detect the change in the braking hydraulic pressure in response to the brake pedal-on state.

Thus, in the step S305, the operation of determining whether or not the braking hydraulic pressure is actually generated may be an operation in which the braking controller 20 compares a change in the detection value of the pressure sensor with the reference value B.

As a result of the comparison, when the change in the detection value of the pressure sensor exceeds the reference value B, the braking hydraulic pressure in response to the brake pedal-on state is determined to be generated ordinarily. In contrast, when the change in the detection value of the pressure sensor does not exceed the reference value B, the braking hydraulic pressure in response to the brake pedal-on state is determined to not be generated.

Here, even in the case that the braking hydraulic pressure in response to the brake pedal-on state is determined to be generated ordinarily in the step S305, when the warning light of the cluster is determined to be in a turned-on state in the step S301, the level sensor detecting the level of the brake fluid may be determined to be malfunctioning.

Subsequently, in S306, the cluster 31 may display a warning phrase, e.g. "LEVEL SENSOR MALFUNCTIONING", and a braking operation reflecting the intention of the driver may be performed, since the braking hydraulic pressure is generated ordinarily.

For example, when the braking controller 20 transmits a signal indicating that the level sensor is malfunctioning to the cluster 31, the cluster 31 may display the warning phrase, e.g. "LEVEL SENSOR MALFUNCTIONING", and the braking operation in response to the driver pressing the brake pedal, i.e. the braking operation reflecting the intention of the driver, may be performed properly.

Thus, the driver may recognize that the braking hydraulic pressure system has no problem due the sufficient brake fluid by checking the warning phrase, e.g. "LEVEL SENSOR MALFUNCTIONING", and take a subsequent operation of only replacing the level sensor.

In contrast, when the braking hydraulic pressure in response to the brake pedal-on state is determined to not be generated in the step S305, the brake fluid is insufficient due to a leakage in the braking hydraulic pressure system. Then, even when the brake pedal is pressed in a braking situation, the pedal is pressed by an insufficient amount of force. Thus, this may cause the brake pedal to feel spongy. Since the brake fluid for the braking hydraulic pressure is not sufficiently supplied to the wheel cylinders of the front and rear wheels, an intended amount of braking force may not be obtained. Thus, this may lead to a collision.

When the braking hydraulic pressure in response to the brake pedal-on state is determined to not be generated in the step S305, the warning phrase is displayed by the cluster and a cooperative control operation of the TCU and the engine controller is performed to reduce the vehicle speed in S307.

For example, when the braking controller 20 transmits a signal indicating the insufficiency of the brake fluid to the cluster 31, the cluster 31 displays a warning phrase, e.g. "BRAKE FLUID IS INSUFFICIENT. GEAR SHIFTING IS NOT ALLOWED AND OPERATION OF PARKING BRAKE IS REQUIRED, SINCE ENGINE BRAKE IS OPERATING".

At the same time, when the braking controller 20 transmits an engine brake operation signal to the TCU 12 and the engine controller 32, engine braking of gradually reducing the driving torque of the engine is activated by the cooperative control operation of the TCU 12 and the engine controller 32. Thus, the vehicle may be driven to a safe place (e.g. a side road of a highway). When the vehicle arrives at the safe place, the driver may safely stop the vehicle by only operating the parking brake. Accordingly, a secondary accident may be prevented and a subsequent maintenance operation may be easily performed.

Here, the engine braking may be automatically activated by the cooperative control operation of the TCU 12 and the engine controller 32 in an automatic transmission vehicle, whereas the driver must directly activate the engine braking in a manual transmission vehicle.

Thus, in the manual transmission vehicle, a warning phrase, e.g. "BRAKE FLUID IS INSUFFICIENT. REQUIRED TO OPERATE ENGINE BRAKE BY MOVING SHIFT POSITION TO 2ND D POSITION AND OPERATE PARKING BRAKE", may be displayed by the cluster in the step S307 in order to guide the driver to directly activate the engine braking by a gear change to the second D position. Thus, the driver may drive the vehicle to a safe place (e.g. a side road of a highway) at the minimum speed while the engine braking is being activated. When the vehicle arrives at the safe place, the driver may safely stop the vehicle by only operating the parking brake. Accordingly, a secondary accident may be prevented and a subsequent maintenance operation may be easily performed.

In contrast, when the brake pedal is determined to not be in the on state in the step S304, i.e. the brake pedal is in an off state in which the driver has detached the foot from the brake pedal instead of pressing the brake pedal, whether or not the braking hydraulic pressure has changed over a predetermined period of time is determined in S308.

The ESC unit used as the braking controller includes a pressure sensor detecting a change in the braking hydraulic pressure. Whether or not the braking hydraulic pressure has a change may be determined on the basis of the change in the detection value of the pressure sensor.

For example, an oscillation phenomenon may occur in the braking hydraulic pressure during driving, even in the case that the driver has not pressed the brake pedal. The pressure sensor may detect a change in the braking hydraulic pressure, due to the oscillation phenomenon.

Thus, when the detection value of the pressure sensor is determined to have changed due to the oscillation phenomenon of the braking hydraulic pressure during driving over a predetermined period of time in the step S308, the braking controller 20 determines that the brake fluid neither is insufficient nor leaks, the cluster displays a corresponding warning phrase, and the vehicle continues the inertial driving in S309.

For example, when the braking controller 20 determines that the brake fluid neither is insufficient nor leaks and transmits a determination signal indicating that the level sensor is malfunctioning to the cluster 31, the cluster 31 displays a warning phrase, e.g. "LEVEL SENSOR MALFUNCTIONING", and the vehicle continues the inertial driving.

In contrast, when the detection value of the pressure sensor is determined to have not changed over the predetermined period of time in the step S308, the braking controller 20 determines that the brake fluid is insufficient or leaks even in the case that the driver has not pressed the brake pedal. The cluster 31 displays a warning phrase indicating the insufficiency of the brake fluid and a guidance phrase indicating a method of finally stopping the vehicle. At the same time, a control operation of limiting the driving torque of the engine is performed so that the vehicle travels at the minimum speed in S310.

For example, when the braking controller 20 transmits a signal indicating the insufficiency of the brake fluid to the cluster 31, the cluster 31 displays a warning phrase, e.g. "BRAKE FLUID INSUFFICIENT", and a guidance phrase, e.g. "PLEASE OPERATE PARKING BRAKE WHEN BRAKING VEHICLE, SINCE THERE IS POSSIBILITY OF FAILURE IN BRAKING HYDRAULIC PRESSURE LINE". When the braking controller 20 transmits the signal regarding the limited driving torque of the engine to the engine controller 32, the engine controller 32 performs a cooperative control operation of limiting the driving torque of the engine. Thus, the vehicle may travel at the minimum speed (e.g. a low speed of about 10 kph or less).

Accordingly, in response to the warning phrase and the guidance phrase provided by the cluster, the driver may drive the vehicle to a safe place (e.g. a side road of a highway) at the minimum speed. In addition, since the vehicle is traveling at the minimum speed (e.g. a low speed of about 10 kph or less) when the vehicle arrives at the safe place, the driver may safely stop the vehicle by only operating the parking brake. Accordingly, a secondary accident may be prevented and a subsequent maintenance operation may be easily performed.

In contrast, when the current shift position is determined to be the N position in the step S303, whether or not the current vehicle speed exceeds a reference vehicle speed (e.g. A kph) is determined in S311.

For example, when a vehicle speed signal is received from the wheel speed sensor 14, the braking controller 20 compares the vehicle speed in the vehicle speed signal with the reference vehicle speed (e.g. A kph).

Here, whether or not the current vehicle speed exceeds the reference vehicle speed is determined in a situation in which the shift position is the N position, in order to determine whether the N position is caused by the driver intending to perform the inertial driving during the driving or the driver having selected the N position while stopping the vehicle.

When the current vehicle speed does not exceed the reference vehicle speed in a situation in which the current shift position is the N position, the vehicle is determined to be in a stopped state. In a subsequent process, the braking controller determines whether or not the braking hydraulic pressure is actually generated, using different methods, depending on the on state of the brake pedal. Afterwards, depending whether or not the braking hydraulic pressure is actually generated, different phrases are displayed by the cluster, and a cooperative control operation of the braking controller and the engine controller is performed.

When the current vehicle speed is determined to not exceed the reference vehicle speed (e.g. A kph) in the P position in the step S311, a braking control method according to the fourth embodiment of the present disclosure is performed. In contrast, when the current vehicle speed exceeds the reference vehicle speed (e.g. A kph) in the P position, a braking control method according to the fifth embodiment of the present disclosure is performed.

Fourth Embodiment

In the accompanying drawings, FIG. 5 is a flowchart illustrating the vehicle braking control method according to the fourth embodiment of the present disclosure.

When the current vehicle speed is determined to not exceed the reference vehicle speed (e.g. A kph) in the P position in the step S311, the driver is determined to have selected the N position during the stopping of the vehicle, and then, whether or not the brake pedal is in the on position is determined in S312.

For example, when a brake pedal-on signal indicating that the driver has pressed the brake pedal is received from the brake pedal switch 11, the braking controller 20 may recognize that the brake pedal is in the on state.

When the brake pedal is determined to be in the on state in the step S312, whether or not the braking hydraulic pressure is actually generated is determined in S313.

In the step S313, the operation of determining whether or not the braking hydraulic pressure is actually generated may be an operation in which the braking controller 20 compares a change in the detection value of the pressure sensor with the reference value B as described above.

As a result of the comparison, when the change in the detection value of the pressure sensor exceeds the reference value B, the braking hydraulic pressure in response to the brake pedal-on state is determined to be generated ordinarily. In contrast, when the change in the detection value of the pressure sensor does not exceed the reference value B, the braking hydraulic pressure in response to the brake pedal-on state is determined to not be generated.

Here, even in the case that the braking hydraulic pressure in response to the brake pedal-on state is determined to be generated ordinarily in the step S313, when the warning light of the cluster is determined to be in a turned-on state in the step S301, the level sensor detecting the level of the brake fluid may be determined to be malfunctioning.

Subsequently, in S314, the cluster 31 may display a warning phrase, e.g. "LEVEL SENSOR MALFUNCTIONING", and a braking operation reflecting the intention of the driver may be performed, since the braking hydraulic pressure is generated ordinarily.

For example, when the braking controller 20 transmits a signal indicating that the level sensor is malfunctioning to the cluster 31, the cluster 31 may display the warning phrase, e.g. "LEVEL SENSOR MALFUNCTIONING", and the braking operation in response to the driver pressing the brake pedal, i.e. the braking operation reflecting the intention of the driver, may be performed properly in a situation in which the braking is performed after the stopped vehicle is restarted.

Thus, the driver may recognize that the braking hydraulic pressure system has no problem due to the sufficient brake fluid by checking the warning phrase, e.g. "LEVEL SENSOR MALFUNCTIONING", and take a subsequent operation of only replacing the level sensor.

In contrast, when the braking hydraulic pressure in response to the brake pedal-on state is determined to not be generated in the step S313, the brake fluid is insufficient due to a leakage in the braking hydraulic pressure system. Then, even when the brake pedal is pressed in a braking situation, the brake pedal is pressed by an insufficient amount of force. Thus, this may cause the brake pedal to feel spongy. Since the brake fluid for the braking hydraulic pressure is not sufficiently supplied to the wheel cylinders of the front and rear wheels, an intended amount of braking force may not be obtained. Thus, this may lead to a collision.

When the braking hydraulic pressure in response to the brake pedal-on state is determined to not be generated in the step S313, the cluster displays a warning phrase instructing that the vehicle remain in the stopped state in S315.

For example, when the braking controller 20 transmits a signal, indicating that the braking hydraulic pressure is not generated, to the cluster 31, the cluster 31 displays a warning phrase, e.g. "BRAKE FLUID LEAKS. OPERATION OF PARKING BRAKE REQUIRED TO MAINTAIN VEHICLE IN STOPPED STATE".

Thus, the driver may maintain the vehicle in the stopped state by activating the parking brake and taken a subsequent maintenance operation.

However, when the place in which the vehicle is located is not a safe place, a control operation of limiting the driving torque of the engine so that the vehicle travels at the minimum speed is performed by moving the current shift position to the D position, as in the above-described step S107 of the first embodiment. Thus, the vehicle may be driven to a safe place (e.g. a side road of a highway). When the vehicle arrives at the safe place, the driver may safely stop the vehicle by only operating the parking brake. Accordingly, a secondary accident may be prevented and a subsequent maintenance operation may be easily performed.

In contrast, when the brake pedal is determined to not be in the on state in the step S312, i.e. i.e. the brake pedal is in the off state in which the driver has detached the foot from the brake pedal instead of pressing the brake pedal, whether or not the braking hydraulic pressure has changed over the previous predetermined period of time is determined in S316.

For example, the ESC unit used as the braking controller includes a pressure sensor detecting a change in the braking hydraulic pressure. A change in the braking hydraulic pressure over the previous predetermined period of time may be determined on the basis of a change in the detection value of the pressure sensor over the previous predetermined period of time.

Accordingly, the step S316 of determining whether or not the braking hydraulic pressure is actually generated over the previous predetermined period of time may be a process in which the braking controller 20 compares the change in the detection value of the pressure sensor over the previous predetermined period of time with a reference value C.

As a result of the comparison, when the change in the detection value of the pressure sensor over the previous predetermined period of time exceeds the reference value C, the braking hydraulic pressure is determined to be able to be generated ordinarily. In contrast, when the change in the detection value of the pressure sensor over the previous predetermined period of time does not exceed the reference value C, the braking hydraulic pressure is determined to not be able to be generated.

When the change in the detection value of the pressure sensor over the previous predetermined period of time is determined to exceed the reference value C in the step S316, the braking controller 20 determines that the braking hydraulic pressure is generated normally, i.e. the brake fluid neither is insufficient nor leaks, the cluster displays a corresponding warning phrase, and a control operation of limiting a maximum speed to an upper threshold is performed in S317.

For example, since the braking hydraulic pressure is generated ordinarily, i.e. the brake fluid does not leak, the braking controller 20 may transmit a determination signal, indicating that the level sensor is malfunctioning, to the cluster 31. Then, the cluster 31 may display the warning phrase "LEVEL SENSOR MALFUNCTIONING." At the same time, the engine controller may limit the maximum speed of the vehicle to a predetermined upper threshold (e.g. 60 kph) as guidance for a maintenance operation of replacing the level sensor or an operation of inspecting the brake fluid.

In contrast, when the change in the detection value of the pressure sensor over the previous predetermined period of time is determined to not exceed the reference value C in the step S316, the braking controller 20 determines that the braking hydraulic pressure is not generated, i.e. the brake fluid leaks, the cluster displays a warning phrase instructing that the vehicle remain in the stopped state. At the same time, a control operation of limiting the maximum speed of the vehicle speed to a lower threshold is performed in S318.

For example, when braking controller 20 transmits a determination signal, indicating that the change in the detection value of the pressure sensor over the previous predetermined period of time does not exceed the reference value C, to the cluster 31, the cluster 31 displays a warning phrase, e.g. "BRAKE FLUID LEAKS. OPERATION OF PARKING BRAKE REQUIRED TO MAINTAIN VEHICLE IN STOPPED STATE". When the vehicle restarts despite the warning phrase, the engine controller may limit the maximum speed of the vehicle to a predetermined lower threshold (e.g. 10 kph) as guidance for the inspection of the brake fluid. Thus, the driver may be guided to drive the vehicle to a safe place and then safely stop the vehicle by operating the parking brake.

In addition, when the current vehicle speed exceeds the reference vehicle speed in a situation in which the current shift position is the N position, the vehicle is determined to be in an inertial driving state. In a subsequent process, the braking controller determines whether or not the braking hydraulic pressure is actually generated, using different methods, depending on the on state of the brake pedal. Afterwards, the cluster displays different phrases depending on whether or not the braking hydraulic pressure is actually generated. At the same time, the TCU and the engine controller perform a cooperative braking control operation in response to a signal from the braking controller.

Fifth Embodiment

In the accompanying drawings, FIG. 6 is a flowchart illustrating a vehicle braking control method according to the fifth embodiment of the present disclosure.

When the current vehicle speed is determined to exceed the reference vehicle speed (e.g. A kph) in the P position in the step S311, the driver is determined to have selected the N position for the inertial driving, and subsequently, whether or not the brake pedal is in the on position is determined in S319.

For example, when the braking controller 20 receives the brake pedal-on signal, indicating that the driver has pressed the brake pedal, from the brake pedal switch 11, the braking controller 20 recognizes the brake pedal is in the on state.

When the brake pedal is determined to be in the on state in the step S319, whether or not the braking hydraulic pressure is actually generated is determined in S320.

The operation of determining whether or not the braking hydraulic pressure is actually generated in the step S320 may be an operation in which the braking controller 20 compares a change in the detection value of the pressure sensor with the reference value B.

As a result of the comparison, when the change in the detection value of the pressure sensor exceeds the reference value B, the braking hydraulic pressure in response to the brake pedal-on state is determined to be generated ordinarily. In contrast, when the change in the detection value of the pressure sensor does not exceed the reference value B, the braking hydraulic pressure in response to the brake pedal-on state is determined to not be generated.

Here, even in the case that the braking hydraulic pressure in response to the brake pedal-on state is determined to be generated ordinarily in the step S320, when the warning light of the cluster is determined to be in a turned-on state in the step S301, the level sensor detecting the level of the brake fluid may be determined to be malfunctioning.

Subsequently, in S321, the cluster 31 may display a warning phrase, e.g. "LEVEL SENSOR MALFUNCTIONING", and a braking operation reflecting the intention of the driver may be performed in a braking situation, since the braking hydraulic pressure is generated ordinarily.

For example, when the braking controller 20 transmits a signal indicating that the level sensor is malfunctioning to the cluster 31, the cluster 31 may display the warning phrase, e.g. "LEVEL SENSOR MALFUNCTIONING." The braking operation in response to the driver pressing the brake pedal in the braking situation, i.e. the braking operation reflecting the intention of the driver, may be performed properly.

In contrast, when the braking hydraulic pressure in response to the brake pedal-on state is determined to not be generated in the step S320, the warning phrase is displayed by a control operation cooperative with the cluster and the TCU and the engine controller is performed to reduce the vehicle speed in S322.

For example, when the braking controller 20 transmits a signal indicating the insufficiency of the brake fluid to the cluster 31, the cluster 31 displays a warning phrase, e.g. "BRAKE FLUID IS INSUFFICIENT. GEAR SHIFTING IS NOT ALLOWED AND OPERATION OF PARKING BRAKE IS REQUIRED, SINCE ENGINE BRAKE IS OPERATING".

At the same time, when the braking controller 20 transmits the engine brake operation signal to the TCU 12 and the engine controller 32, the TCU 12 autonomously performs a control operation of moving the current shift position from the N position to the D position. At the same time, the engine braking of gradually reducing the driving torque of the engine is activated by the cooperative control operation of the TCU 12 and the engine controller 32. Thus, the vehicle may be driven to a safe place (e.g. a side road of a highway). When the vehicle arrives at the safe place, the driver may safely stop the vehicle by only operating the parking brake. Accordingly, a secondary accident may be prevented and a subsequent maintenance operation may be easily performed.

Here, the engine braking may be automatically activated by the cooperative control operation of the TCU 12 and the engine controller 32 in an automatic transmission vehicle, whereas the driver must directly activate the engine braking in a manual transmission vehicle.

Thus, in the manual transmission vehicle, a warning phrase, e.g. "BRAKE FLUID INSUFFICIENT. REQUIRED TO OPERATE ENGINE BRAKE BY MOVING SHIFT POSITION TO 2ND D POSITION AND OPERATE PARKING BRAKE", may be displayed by the cluster in the step S307 in order to guide the driver to directly activate the engine braking by a gear change to the second D position. Thus, the driver may drive the vehicle to a safe place (e.g. a side road of a highway) at the minimum speed while the engine braking is being activated. When the vehicle arrives at the safe place, the driver may safely stop the vehicle by only operating the parking brake. Accordingly, a secondary accident may be prevented and a subsequent maintenance operation may be easily performed.

In contrast, when the brake pedal is determined to not be in the on state in the step S319, i.e. the driver has detached the foot from the brake pedal instead of pressing the brake pedal, whether or not the braking hydraulic pressure has a change over a predetermined period of time is determined in S323.

For example, the ESC unit used as the braking controller includes a pressure sensor detecting a change in the braking hydraulic pressure, and the change in the braking hydraulic pressure over the previous predetermined period of time may be determined on the basis of a change in the detection value of the pressure sensor over the previous predetermined period of time.

In the step S323, the operation of determining whether or not the braking hydraulic pressure is actually generated over the previous predetermined period of time may be an operation in which the braking controller 20 compares the change in the detection value of the pressure sensor over the previous predetermined period of time with a reference value C.

As a result of the comparison, when the change in the detection value of the pressure sensor over the previous predetermined period of time exceeds the reference value C, the braking hydraulic pressure is determined to be able to be generated ordinarily. In contrast, when the change in the detection value of the pressure sensor over the previous predetermined period of time does not exceed the reference value C, the braking hydraulic pressure is determined to not be able to be generated.

When the change in the detection value of the pressure sensor over the previous predetermined period of time is determined to exceed the reference value C in the step S323, the braking controller 20 determines that the braking hydraulic pressure is generated normally, i.e. the brake fluid neither is insufficient nor leaks, the cluster displays a corresponding warning phrase, and the vehicle continues the inertial driving in S324.

For example, when the braking controller 20 determines that the brake fluid neither is insufficient nor leaks and transmits a determination signal indicating that the level sensor is malfunctioning to the cluster 31, the cluster 31 displays a warning phrase, e.g. "LEVEL SENSOR MALFUNCTIONING", and the vehicle continues the inertial driving.

In contrast, when the change in the detection value of the pressure sensor over the previous predetermined period of time is determined to not exceed the reference value C in the step S323, the braking controller 20 determines that the braking hydraulic pressure is not generated, i.e. the brake fluid is insufficient or leaks, the cluster displays a warning phrase. At the same time, a control standby mode cooperative with the TCU and the engine controller is taken in order to reduce the vehicle speed in S325.

For example, when the braking controller 20 transmits a signal indicating the insufficiency of the brake fluid to the cluster 31, the cluster 31 displays a warning phrase, e.g. "BRAKE FLUID IS INSUFFICIENT. GEAR SHIFTING IS NOT ALLOWED AND OPERATION OF PARKING BRAKE IS REQUIRED, SINCE ENGINE BRAKE IS OPERATING". Before a brake-on state, the control standby mode cooperative with the TCU and the engine controller is maintained.

When the brake pedal is in the on state while control standby mode cooperative with the TCU and the engine controller is being maintained, the braking controller 20 transmits an engine brake activation signal to the TCU 12 and the engine controller 32, the TCU 12 autonomously performs a control operation of moving the current shift position from the N position to the D position. At the same time, the engine braking of gradually reducing the driving torque of the engine is activated by the cooperative control operation of the TCU 12 and the engine controller 32. Thus, the vehicle may be driven to a safe place. When the vehicle arrives at the safe place, the driver may safely stop the vehicle by only operating the parking brake. Accordingly, a secondary accident may be prevented and a subsequent maintenance operation may be easily performed.

What is claimed is:

1. A vehicle braking control method comprising:
   determining a start state of an engine of a vehicle;
   determining whether or not a warning light of a cluster is turned on, the warning light indicating insufficiency of a brake fluid;
   determining, by a braking controller, whether or not a brake pedal is in an on state;
   when the brake pedal is in the on state, determining whether or not braking hydraulic pressure has actually been generated; and
   when the braking hydraulic pressure is determined not to be actually generated, displaying, by the cluster, a warning phrase indicating the insufficiency of the brake fluid and a guidance phrase for a method of finally stopping the vehicle, and simultaneously, controlling the vehicle to travel at a minimum speed or stop by cooperative control between the braking controller and an engine controller.

2. The vehicle braking control method of claim 1, wherein, in response to determining that the warning light is turned on in a situation in which the engine is in a turned-off state, determining that the engine is turned on in the on state of the brake pedal,
   in response to determining that the engine is turned on, an operation in which the braking controller determines a mileage of the vehicle, an operation of determining whether or not the braking hydraulic pressure is actually generated, and an operation of determining whether or not a current shift position is moved to a drive position or a reverse position are performed sequentially.

3. The vehicle braking control method of claim 2, wherein, when the mileage exceeds a reference distance for determining whether or not the vehicle has been delivered, the braking hydraulic pressure is not generated, and the current shift position is the drive position or the reverse position,
   the cluster displays a warning phrase indicating the insufficiency of the brake fluid and a guidance phrase indicating a method of finally stopping the vehicle, and simultaneously, driving torque of the engine is limited by a cooperative control operation of the braking controller and the engine controller so that the vehicle travels at the minimum speed.

4. The vehicle braking control method of claim 2, wherein, when the mileage does not exceed a reference distance for determining whether or not the vehicle has been delivered, the braking hydraulic pressure has been determined to be not generated, and the current shift position is the drive position or the reverse position,
   the cluster displays a warning phrase indicating the insufficiency of the brake fluid, and simultaneously, driving torque of the engine is limited by a cooperative control operation of the braking controller and the engine controller so that the vehicle stops.

5. The vehicle braking control method of claim 1, wherein the determining of whether or not the braking hydraulic pressure is actually generated comprises:
   detecting, by a pressure sensor of the braking controller, a change in the braking hydraulic pressure;
   comparing, by the braking controller, the change in the braking hydraulic pressure with a reference value; and
   when the change in the braking hydraulic pressure exceeds the reference value as a result of the comparison, determining that the braking hydraulic pressure is generated ordinarily, and when the change in the braking hydraulic pressure does not exceed the reference value, determining that the braking hydraulic pressure is not generated.

6. The vehicle braking control method of claim 1, wherein, in a situation in which the engine is in a turned-on state, when the braking hydraulic pressure is determined to be generated ordinarily, the determining of whether or not the warning light of the cluster is turned on is performed again, the warning light indicating the insufficiency of the brake fluid.

7. The vehicle braking control method of claim 1, wherein, when the warning light of the cluster is turned on in a situation in which the engine is in a turned-on state,
   checking, by the braking controller, a current shift position; when the current shift position is a drive position, determining whether or not the brake pedal is in the on state;
   determining whether or not the braking hydraulic pressure is actually generated, using different methods, depending on whether or not the brake pedal is in the on state; and displaying, by the cluster, different phrases depending on whether or not the braking hydraulic pressure is actually generated.

8. The vehicle braking control method of claim 7, wherein, when the brake pedal is in the on state, the determining of whether or not the braking hydraulic pressure is actually generated comprises:
   detecting, by a pressure sensor of the braking controller, a change in the braking hydraulic pressure;
   comparing, by the braking controller, the change in the braking hydraulic pressure detected by the pressure sensor with a reference value; and
   when the change in the braking hydraulic pressure detected by the pressure sensor exceeds the reference value as a result of the comparison, determining that the braking hydraulic pressure is generated ordinarily, and when the change in the braking hydraulic pressure detected by the pressure sensor does not exceed the reference value, determining that the braking hydraulic pressure is not generated.

9. The vehicle braking control method of claim 8, wherein, when the braking hydraulic pressure is determined to be generated ordinarily, the cluster displays a warning phrase indicating that a level sensor detecting a level of the brake fluid is malfunctioning, and when the braking hydraulic pressure is determined to not be generated, the cluster displays a warning phrase indicating that the brake fluid is insufficient and a parking brake is required to be operated, and simultaneously, an engine braking operation of reducing driving torque of the engine is activated by a cooperative control operation of a transmission control unit and the engine controller in order to reduce a speed of the vehicle.

10. The vehicle braking control method of claim 9, wherein, when the cluster displays the warning phrase indicating that the brake fluid is insufficient and the parking brake is required to be operated, a phrase indicating the engine braking operation is required to be activated is additionally displayed in a situation in which the vehicle is a manual transmission vehicle.

11. The vehicle braking control method of claim 7, wherein, when the brake pedal is in an off state, the determining of whether or not the braking hydraulic pressure is actually generated comprises:

detecting, by a pressure sensor of the braking controller, a change in the braking hydraulic pressure due to oscillation;

when a value of the braking hydraulic pressure detected by the pressure sensor is determined to have been changed due to the oscillation of the braking hydraulic pressure during driving over a predetermined period of time, determining, by the braking controller, that the brake fluid neither is insufficient nor leaks; and when the value of the braking hydraulic pressure detected by the pressure sensor is determined to have not been changed over the predetermined period of time, determining, by the braking controller, that the brake fluid is insufficient or leaks.

12. The vehicle braking control method of claim 11, wherein, when the braking controller determines that the brake fluid neither is insufficient nor leaks, the displaying, by the cluster, the warning phrase indicating a level sensor is malfunctioning is performed, and when the braking controller determines that the brake fluid is insufficient or leaks, displaying, by the cluster, a warning phrase indicating that the brake fluid is insufficient and a guidance phrase indicating a method of finally stopping the vehicle, and simultaneously, limiting driving torque of the engine so that the vehicle travels at the minimum speed by a cooperative control operation of the braking controller and the engine controller are performed simultaneously.

13. The vehicle braking control method of claim 1, wherein, when the warning light of the cluster is turned on in a situation in which the engine is in a turned-on state, checking, by the braking controller, a current shift position;

when the current shift position is a neutral position, determining whether or not a current speed of the vehicle exceeds a reference speed;

when the current speed of the vehicle does not exceed the reference speed, determining whether or not the brake pedal is in the on state;

determining whether or not the braking hydraulic pressure is actually generated, using different methods, depending on whether or not the brake pedal is in the on state; and displaying, by the cluster, different phrases depending on whether or not the braking hydraulic pressure is actually generated.

14. The vehicle braking control method of claim 13, wherein, when the brake pedal is in the on state, the determining of whether or not the braking hydraulic pressure is actually generated comprises:

detecting, by a pressure sensor of the braking controller, a change in the braking hydraulic pressure;

comparing, by the braking controller, the change in the braking hydraulic pressure detected by the pressure sensor with a reference value; and when the change in the braking hydraulic pressure detected by the pressure sensor exceeds the reference value as a result of the comparison, determining that the braking hydraulic pressure is generated ordinarily, and when the change in the braking hydraulic pressure detected by the pressure sensor does not exceed the reference value, determining that the braking hydraulic pressure is not generated.

15. The vehicle braking control method of claim 14, wherein, when the braking hydraulic pressure is determined to be generated ordinarily, the cluster displays a warning phrase indicating that a level sensor detecting a level of the brake fluid is malfunctioning, and when the braking hydraulic pressure is determined to not be generated, the cluster displays a warning phrase instructing that the vehicle remain in a stopped state.

16. The vehicle braking control method of claim 13, wherein, when the brake pedal is in an off state, the determining of whether or not the braking hydraulic pressure is actually generated comprises:

determining, by a pressure sensor of the braking controller, whether or not the braking hydraulic pressure has changed over a predetermined period of time;

comparing the change in the braking hydraulic pressure over the predetermined period of time, detected by the pressure sensor, with a reference value; and when the change in the braking hydraulic pressure over the predetermined period of time, detected by the pressure sensor, exceeds the reference value as a result of the comparison, determining that the braking hydraulic pressure is generated ordinarily, and when the change in the braking hydraulic pressure over the predetermined period of time, detected by the pressure sensor, does not exceed the reference value, determining that the braking hydraulic pressure is not generated.

17. The vehicle braking control method of claim 16, wherein, when the braking hydraulic pressure is determined to be generated ordinarily, the cluster displays a warning phrase indicating that a level sensor is malfunctioning, and simultaneously, the engine controller controls a maximum speed of the vehicle to be limited to an upper threshold, and when the braking hydraulic pressure is determined to not be generated ordinarily, the cluster displays a warning phrase instructing that the vehicle remain in a stopped state, and simultaneously, the engine controller controls the maximum speed of the vehicle to be limited to a lower threshold.

18. The vehicle braking control method of claim 1, wherein, when the warning light of the cluster is turned on in a situation in which the engine is in a turned-on state, checking, by the braking controller, a current shift position;

when the current shift position is a neutral position, determining whether or not a current speed of the vehicle exceeds a reference speed;

when the current speed of the vehicle exceeds the reference speed, determining whether or not the brake pedal is in the on state;

determining whether or not the braking hydraulic pressure is actually generated, using different methods, depending on whether or not the brake pedal is in the on state; and displaying, by the cluster, different phrases depending on whether or not the braking hydraulic pressure is actually generated.

19. The vehicle braking control method of claim 18, wherein, when the brake pedal is in the on state, the determining of whether or not the braking hydraulic pressure is actually generated comprises:

detecting, by a pressure sensor of the braking controller, a change in the braking hydraulic pressure;

comparing, by the braking controller, the change in the braking hydraulic pressure detected by the pressure sensor with a reference value; and when the change in the braking hydraulic pressure detected by the pressure sensor exceeds the reference value as a result of the comparison, determining that the braking hydraulic pressure is generated ordinarily, and when the change in the braking hydraulic pressure detected by the pressure sensor does not exceed the reference value, determining that the braking hydraulic pressure is not generated.

20. The vehicle braking control method of claim 19, wherein, when the braking hydraulic pressure is determined to be generated ordinarily, the cluster displays a warning phrase indicating that a level sensor detecting a level of the brake fluid is malfunctioning, and when the braking hydraulic pressure is determined to not be generated, the cluster displays a warning phrase indicating that the brake fluid is insufficient and a parking brake is required to be operated, and simultaneously, an engine braking operation of reducing driving torque of the engine is activated by a cooperative control operation of a transmission control unit and the engine controller in order to reduce a speed of the vehicle.

21. The vehicle braking control method of claim 20, wherein, when the cluster displays the warning phrase indicating that the brake fluid is insufficient and the parking brake is required to be operated, a phrase indicating the engine braking operation is required to be activated is additionally displayed in a situation in which the vehicle is a manual transmission vehicle.

22. The vehicle braking control method of claim 18, wherein, when the brake pedal is in an off state, the determining of whether or not the braking hydraulic pressure is actually generated comprises:

determining, by a pressure sensor of the braking controller, whether or not the braking hydraulic pressure has changed over a predetermined period of time;

comparing the change in the braking hydraulic pressure over the predetermined period of time, detected by the pressure sensor, with a reference value; and when the change in the braking hydraulic pressure over the predetermined period of time, detected by the pressure sensor, exceeds the reference value as a result of the comparison, determining that the braking hydraulic pressure is generated ordinarily, and when the change in the braking hydraulic pressure over the predetermined period of time, detected by the pressure sensor, does not exceed the reference value, determining that the braking hydraulic pressure is not generated.

23. The vehicle braking control method of claim 22, wherein, when the braking hydraulic pressure is determined to be generated ordinarily, the cluster displays a warning phrase indicating that a level sensor is malfunctioning, and when the braking hydraulic pressure is determined to not be generated, the cluster displays a warning phrase indicating that the brake fluid is insufficient and a parking brake is required to be operated, and simultaneously, a control standby mode cooperative with a transmission control unit and the engine controller is taken in order to reduce a speed of the vehicle.

24. The vehicle braking control method of claim 23, wherein, when the brake pedal is in the on state while the control standby mode cooperative with the transmission control unit and the engine controller is being maintained, an engine braking operation of gradually reducing driving torque of the engine is activated by a control cooperative operation of the transmission control unit and the engine controller.

* * * * *